United States Patent [19]

Talacko

[11] Patent Number: 5,209,948
[45] Date of Patent: May 11, 1993

[54] METHOD FOR FLUIDIZING, CONVEYING AND/OR ATOMIZING SOLID AND LIQUID COATING MATERIALS

[75] Inventor: Radovan Talacko, St. Gallen, Switzerland

[73] Assignee: Wagner International AG, Switzerland

[21] Appl. No.: 706,255

[22] Filed: May 28, 1991

[30] Foreign Application Priority Data

May 31, 1990 [DE] Fed. Rep. of Germany ....... 4017603

[51] Int. Cl.5 .............................................. B05D 1/06
[52] U.S. Cl. ................................... 427/185; 427/421; 427/459; 427/484
[58] Field of Search .................. 427/27, 185, 421, 33, 427/459, 483, 484; 239/3, 8, 128, 708; 118/308, 629, DIG. 5

[56] References Cited

U.S. PATENT DOCUMENTS

| | | | |
|---|---|---|---|
| 3,847,118 | 11/1974 | Ambry | 118/629 X |
| 4,759,500 | 7/1988 | Hoffman et al. | 427/27 X |
| 4,836,446 | 6/1989 | Chanel | 239/8 X |

Primary Examiner—Evan Lawrence
Attorney, Agent, or Firm—Hill, Steadman & Simpson

[57] ABSTRACT

A method of fluidizing, conveying and/or atomizing powdery or liquid coating material in surface coating, particularly in electrostatic surface coating. An inert gas under high pressure is reduced to a lower, operating pressure, whereby it cools to a temperature below the ambient temperature, and is employed as compressed gas for fluidizing, conveying and/or atomizing coating material.

6 Claims, No Drawings

METHOD FOR FLUIDIZING, CONVEYING AND/OR ATOMIZING SOLID AND LIQUID COATING MATERIALS

TECHNICAL FIELD

The invention is directed to a method for fluidizing, conveying and/or atomizing powdery and liquid coating materials, particularly for such materials used in conjunction with compressed gas in an electrostatic surface coating system.

BACKGROUND OF THE INVENTION

In surface coating systems, compressed air is made available either directly from a compressor or from a compressed air network, and is employed for fluidizing, for conveying and for atomizing coating powder. In coating systems used to apply liquid materials, compressed air is used for atomizing coating liquids (e.g. paints and lacquers). In both powder and liquid systems, pressure-reducing valves are provided in order to regulate the compressed air supplied from the network or compressor, with common operating pressures falling generally in a range of 8 through 12 bar.

Compressed air is available nearly everywhere, and represents an extremely cost-beneficial pressure medium. Intensive investigations, however, have shown that compressed air also has numerous disadvantages when used in certain surface coating systems. For example, compressed air entrains water and oil residues. The presence of water and oil in the coating material being applied to the work piece may result in unacceptable coating results. Consequently, water separators and de-oilers are utilized, considerably increasing the operating costs of the coating system. It is also significant that the temperature of the compressed air in such systems either corresponds to ambient temperature, or is slightly above ambient temperature, due to the compression process. The ionization capability of air is proportional to its temperature. As a result, comparatively warm compressed air employed for atomizing the coating material in electrostatic coating systems becomes highly charged, thus degrading the efficiency of charging the powder particles or liquid droplets. Although it is possible to cool the atomizer air with cooling units, such practice is relatively expensive. Further problems with cooling units arise in the need for insulation to maintain lower air temperatures, and in the increased bulk and weight of cooling units integrated into manual spray guns.

SUMMARY OF THE INVENTION

It is therefore an object of the present invention to provide an economically feasible method of providing pressurized fluid to a coating system, wherein deterioration of the coating material due to droplets of water and/or oil is eliminated, and wherein a high charging efficiency of the coating material in electrostatic coating systems is maintained. These and other objects are achieved in a method wherein the pressure of a source of inert gas under high pressure is reduced to the required operating pressure. When the pressure of the inert gas is reduced, it cools to a temperature below ambient temperature. The reduced-pressure, cooled inert gas is then employed as a pressurized fluid in a coating system.

DESCRIPTION OF THE PREFERRED EMBODIMENT

It has been found that pure nitrogen is especially suitable for use in the method of the present invention. Liquid nitrogen is readily available in pressure bottles or tanks, is comparatively inexpensive, and is substantially free of water and oil residues. When liquefied nitrogen is gasified (for instance via a number of reducing stages), it is easy to maintain the nitrogen gas at a desired operating pressure of, for example, 2 through 6 bar, and to simultaneously achieve an advantageous operating temperature of, for example, 5° through 10° C., without any external source of energy. Tests have shown that when this comparatively cool gas is employed in a coating system, higher specific quantities of powder are injected ad conveyed than when comparatively warm compressed air used in a similar system. Furthermore, it has been experimentally found that, in electrostatic coating systems, the cooler nitrogen gas accepts less of a charge during the charging event in the region of the electrostatic field than does the warmer compressed air. Therefore, more charge energy is directly tranferrred onto the powder or liquid particles, thus significantly improving charging and precipitation efficiency. With inert gas, the atomizer mist is kept essentially free of air and, thus, of oxygen, so that the spray issuing from the spray coating device is not an ignitible gas. This inhibits the formation of an ignitible gas atmosphere in the work room or spray chamber, thus reducing the risks of explosion or fire.

When brought to a temperature of between 5° and 10° C., the temperature variation of the nitrogen being conveyed through the supply lines is minimal due to the comparatively high flow rates. Thus, even in systems using relatively long fluid supply lines, the temperature of the nitrogen gas remains relatively low.

When the pure inert gas is employed as atomizer air in air-seated rotational atomizers, the inert gas may also be used to drive the rotational atomizer. This is particularly advantageous, since the use of an inert gas substantially eliminates the problems arising due to the presence of droplets of water and oil in the drive gas.

Highly compressed nitrogen gas can also be used for operation instead of liquid nitrogen, whereby the desired reduction in temperature is achieved by the expansion process during pressure reduction. It is also possible to use pure carbon dioxide instead of pure nitrogen. $CO_2$ is comparable to nitrogen with respect to physical condition changes as well as pressure-temperature characteristics, is similarly cost-beneficial, and provides a similar protective gas atmosphere. The above-mentioned operating pressures of 2 through 6 bar and operating temperatures of 5° through 10° C., of course, are only exemplary.

Even though the initial cost of the inert gas, for instance nitrogen, is somewhat higher than that of compressed air, inert gas is nonetheless economically feasible, since water separators and de-oilers are no longer required, and since inert gas provides higher precipitation and charging efficiency in electrostatic coating systems. Furthermore, due to the safety benefits of inert gas, there is no need to provide a precautionary fire extinguisher in the spray area.

Although the present invention has been described with reference to a specific embodiment, those of skill in the art will recognize that changes may be made thereto without departing from the scope and spirit of the invention as set forth in the appended claims.

I claim as my invention:

1. A method of providing pressurized fluid to a coating system having a pressurized fluid supply line, said method comprising the following steps:

providing a source of pure inert gas maintained at substantially ambient temperature, and at a pressure substantially higher than an operating pressure of said coating system;

reducing the pressure of said inert gas approximately to said operating pressure, thereby causing the temperature of the inert gas to fall below ambient temperature; and supplying the reduced-pressure, cooled inert gas as a compressed gas in said pressurized fluid supply line for fluidizing, conveying, and/or atomizing a coating material.

2. A method according to claim 1, wherein said step of reducing the pressure of said inert gas results in causing the temperature of the inert gas to fall to a temperature in a range of 5°-10° C.

3. A method according to claim 1, wherein said step of providing a source of pure inert gas comprises providing a supply of pure inert gas liquefiable under high pressure.

4. A method according to claim 3, wherein said step of providing a source of pure inert gas comprises providing a supply of pure liquid nitrogen.

5. A method according to claim 1, wherein said step of providing a source of pure inert gas comprises providing a supply of pure compressed gaseous nitrogen.

6. A method according to claim 1, wherein said step of providing a source of pure inert gas comprises providing a supply of pure carbon dioxide.

* * * * *